B. LOPEZ.
ROLLER DISTRIBUTER.
APPLICATION FILED OCT. 27, 1919.
1,349,726.
Patented Aug. 17, 1920.
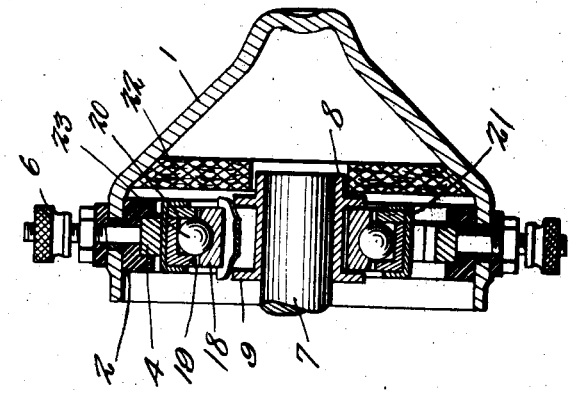
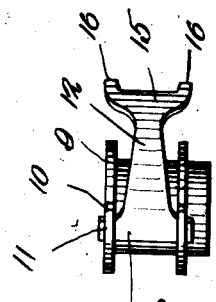
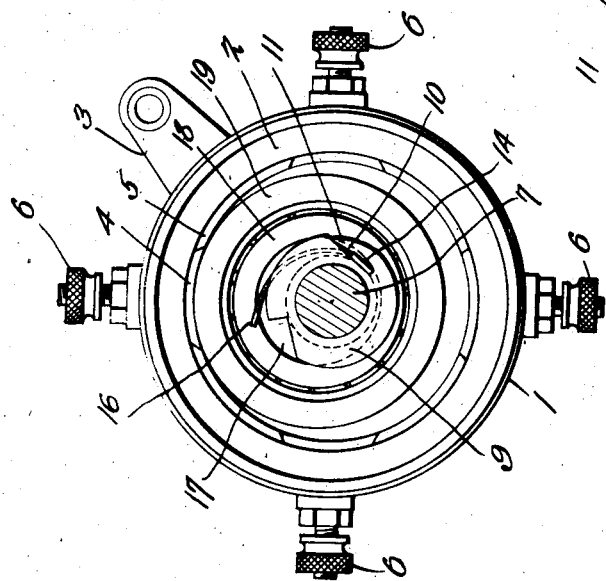
Inventor
Bruno Lopez
By C. A. Snow & Co.
Attorneys
Witness

UNITED STATES PATENT OFFICE.

BRUNO LOPEZ, OF SAN ANTONIO, TEXAS.

ROLLER-DISTRIBUTER.

1,349,726.  Specification of Letters Patent.  Patented Aug. 17, 1920.

Application filed October 27, 1919. Serial No. 333,648.

*To all whom it may concern:*

Be it known that I, BRUNO LOPEZ, a citizen of the United States, residing at San Antonio, in the county of Bexar and State of Texas, have invented a new and useful Roller-Distributer, of which the following is a specification.

The device forming the subject matter of this application is a distributer of the sort used on a light and relatively inexpensive automobile of widely known construction, and the invention aims to provide novel means whereby friction will be reduced, a novel spring means being employed for holding certain of the parts in place.

A mechanic may change the structure shown and described, within the scope of what is claimed, without departing from the spirit of the invention.

In the drawings:—Figure 1 shows in end elevation, a device constructed in accordance with the invention; Fig. 2 is a longitudinal section; Fig. 3 is a plan showing the collar and the spring.

The numeral 1 denotes a casing carrying an arm 3 whereby the casing may be rocked to adjust the timing. An insulating ring 2 is located within the casing and carries contacts 4, alternating with insulating strips 5 to form a track. Binding posts 6, insulated from the casing 1, are connected with the contacts 4. The structure above described is more or less common and need not be alluded to at great length. The numeral 7 denotes a shaft on which a collar 8 is mounted, the same having end flanges 9 provided with notches 10 defining bendable fingers 11. Seats 17 are fashioned in the flanges 9 in spaced relation to the notches 10. A spring arm 12 extends circumferentially of the collar 8, the arm having at one end, a transverse head 14, the ends of which are received in the notches 10 of the flanges 9 on the collar 8. The fingers 11 are bent inwardly as shown in Fig. 1, to grip the ends of the head 14, and thus the inner end of the spring arm 12 is attached to the collar 8. The outer end of the spring arm 12 is provided with an enlarged head 15 having projections 16.

A ball race 18 surrounds the collar 8. The ball race 18 is received between the fingers 16 of the spring arm 12 and thus the ball race and parts to be described hereinafter are held yieldably in eccentric relation to the shaft 7. The part of the ball race 18 which is opposite to the head 15 of the spring arm 12 is held, by the action of the arm, between the flanges 9 of the collar 8, as Fig. 1 will make manifest. The ball race 18 is located within a second ball race including a main member 19 of annular form, and a side closure 20 of annular form, the main member being L-shaped in cross section as Fig. 2 will show. Anti-friction devices, such as balls 23, are located between the ball race 19—20 on the one hand, and the ball race 18 on the other hand. The parts 19 and 20 of the outer ball race are held within an annular retainer 21 which is trough-shaped in cross section. A packing 22 may be located in the casing 1 behind the parts above described.

It will be clear that the spring arm 12 holds the ball race 18, the ball race 19—20 and the retainer 21 in eccentric relation to the shaft 7 so that when the collar 8 rotates, the retainer 21 will sweep across the contacts 4, one after another. The anti-friction balls 23 exercise an obvious function, reducing wear, eliminating noise and cutting down lubrication. The head 15 of the spring arm 12 is adapted to be received in the seats 17 when the arm is flexed and compressed during the mounting of the ball race 18 between the flanges 9 of the collar 8.

I claim:

1. In a device of the class described, a casing having contacts; a shaft; a collar on the shaft; inner and outer members about the collar; anti-friction devices between said members; and a spring arm extended circumferentially of the collar, the inner end of the arm being attached to the collar, and the outer end of the arm coöperating with the inner member to hold the outer member yieldably in eccentric relation to the shaft for coöperation with the contacts.

2. In a device of the class described, a casing having contacts; a shaft; a collar on the shaft and including flanges having notches defining bendable fingers; inner and outer members about the collar; anti-friction devices between said members; a spring arm extended circumferentially of the collar, the arm having a head at one end, received in the notches, the fingers being bent to engage the head, and the arm being supplied at its other end with projections between which the inner member is received, the arm constituting means for maintaining the outer member in operative relation to the contacts.

3. A device of the class described, constructed as set forth in claim 2, and further characterized by the fact that the flanges are provided with seats into which the head may be compressed, to facilitate the assembly of the inner member with the collar.

4. A device of the class described comprising a casing having contacts; a shaft; a collar on the shaft and provided with flanges; an inner ball race disposed eccentrically of the shaft and received in part between the flanges; a spring arm extended circumferentially of the collar between the flanges and engaged at its ends with the collar and with the ball race to hold the ball race between the flanges and eccentrically of the shaft; an outer ball race coöperating with the contacts; and balls between the ball races.

In testimony that I claim the foregoing as my own, I have hereto affixed my signature in the presence of two witnesses.

BRUNO LOPEZ.

Witnesses:
   AVEL RODRIGUEZ,
   LEE R. VANCE.